United States Patent [19]

Tyuluman

[11] Patent Number: 5,680,536
[45] Date of Patent: Oct. 21, 1997

[54] DUAL MOTHERBOARD COMPUTER SYSTEM

[76] Inventor: Samuel A. Tyuluman, 5 Shenandoah, Richardson, Tex. 75080

[21] Appl. No.: 563,747

[22] Filed: Nov. 29, 1995

Related U.S. Application Data

[63] Continuation of Ser. No. 218,912, Mar. 25, 1994, abandoned.

[51] Int. Cl.[6] ............................................. G06F 11/00
[52] U.S. Cl. ............................ 395/180; 395/800; 395/282
[58] Field of Search ........................ 395/182.09, 182.1, 395/182.11, 182.12, 800, 200.01, 280, 281, 282, 283, 284, 180, 182.08

[56] References Cited

U.S. PATENT DOCUMENTS

| | | | |
|---|---|---|---|
| 3,959,638 | 5/1976 | Blum et al. | 371/11.3 |
| 4,237,546 | 12/1980 | Wells | 364/900 |
| 4,414,624 | 11/1983 | Summer, Jr. et al. | 364/200 |
| 4,527,235 | 7/1985 | Chebra | 371/11.3 |
| 4,608,688 | 8/1986 | Hansen et al. | 371/11.3 |
| 4,709,325 | 11/1987 | Yajima | 371/11.3 |
| 4,777,615 | 10/1988 | Potash | 364/900 |
| 4,805,091 | 2/1989 | Thiel et al. | 364/200 |
| 4,958,273 | 9/1990 | Anderson et al. | 371/11.3 |
| 5,109,512 | 4/1992 | Bahr et al. | 395/650 |
| 5,113,523 | 5/1992 | Colley et al. | 395/800 |
| 5,119,498 | 6/1992 | McNeill et al. | 395/800 |
| 5,146,607 | 9/1992 | Sood et al. | 395/800 |
| 5,179,667 | 1/1993 | Iyer | 395/275 |
| 5,187,794 | 2/1993 | Hall | 395/800 |
| 5,201,038 | 4/1993 | Fielder | 395/325 |
| 5,202,965 | 4/1993 | Ahn et al. | 395/325 |
| 5,257,387 | 10/1993 | Richek et al. | 395/800 |
| 5,297,260 | 3/1994 | Kametani | 395/800 |
| 5,321,808 | 6/1994 | Rupp | 395/164 |
| 5,325,517 | 6/1994 | Baker et al. | 395/575 |
| 5,367,689 | 11/1994 | Mayer et al. | 395/725 |
| 5,403,420 | 4/1995 | Gall et al. | 156/182 |
| 5,493,655 | 2/1996 | Shen et al. | 395/280 |

Primary Examiner—Robert W. Beausoliel, Jr.
Assistant Examiner—Joseph E. Palys
Attorney, Agent, or Firm—Baker & Botts, L.L.P.

[57] ABSTRACT

A dual motherboard computer system is provided that comprises a single chassis (10) that holds a motherboard A and a motherboard B. Motherboard A supports its own set of peripheral boards (40) and motherboard B supports it own set of peripheral boards (44). The motherboards share a power supply (46). A motherboard select circuit (48) arbitrates which motherboard is in control of a shared keyboard port (22), a shared video port (24), and a shared serial port (26).

16 Claims, 3 Drawing Sheets

DUAL MOTHERBOARD COMPUTER SYSTEM

CROSS REFERENCE TO RELATED APPLICATIONS

This application is a continuation of application Ser. No. 08/218,912 filed Mar. 25, 1994, entitled "Dual Motherboard Computer System," by Samuel A. Tyuluman, now abandoned.

TECHNICAL FIELD OF THE INVENTION

This invention relates in general to the field of data processing systems and more particularly to an improved dual motherboard computer system and method of operation.

BACKGROUND OF THE INVENTION

With the increasing power and downsizing of personal computer technology, these systems have become pervasive in data processing environments. However, even personal computer systems are susceptible to trends involving increased reliability and further downsizing. In terms of reliability, critical operations such as network management and various server applications require reliability which often requires the construction of redundant systems.

In terms of the downsizing and increased potential of personal computer systems, as the power of personal computers increase so does the expectations of what software can be executed by these systems. As such, personal computer software and integrated software systems are demanding more and more processing power and execution time from personal computers struggling in multi-tasking and windowed environments.

Accordingly, a need has arisen for a computing solution that allows for the convenient size and power requirements of a personal computer, but multiplies the reliability and processing power of the system.

SUMMARY OF THE INVENTION

In accordance with the teachings of the present invention, a dual motherboard computer system is provided that substantially eliminates or reduces disadvantages and problems associated with prior art computing solutions.

According to one embodiment of the present invention, a data processing system is provided that comprises a single chassis supporting a power supply. A first motherboard is mounted within the chassis and coupled to the power supply. A second motherboard is also mounted within the single chassis and coupled to the power supply. A single keyboard is coupled to the first and second motherboards through a keyboard switch. A video display unit is coupled to the first and second motherboards through a video switch. A decoder circuit is operable to receive inputs from the keyboard circuit to selectively couple the first and second motherboards to the keyboard and video display unit.

BRIEF DESCRIPTION OF THE DRAWINGS

A more complete understanding of the present invention may be acquired by referring to the Detailed Description of the Invention when taken in conjunction with the accompanying drawings in which like numbers represent like features and wherein.

DETAILED DESCRIPTION OF THE INVENTION

Figure 1A:
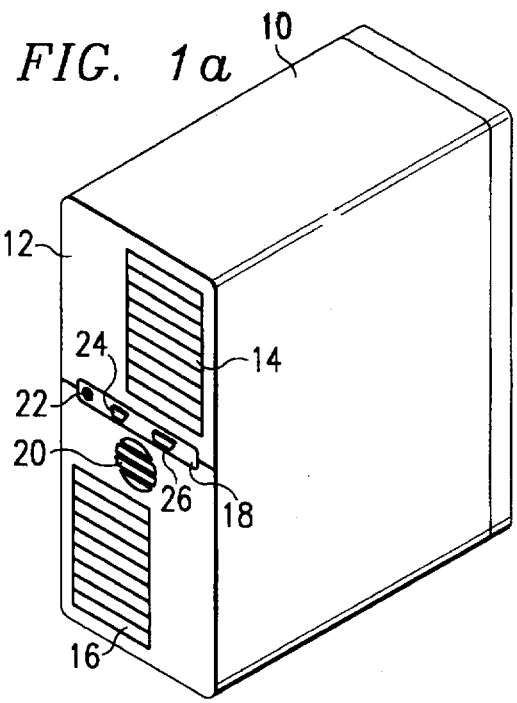
FIGS. 1a through 1c are elevational diagrams of a duel motherboard computer system constructed according to the teachings of the present invention.
Figure 1B:
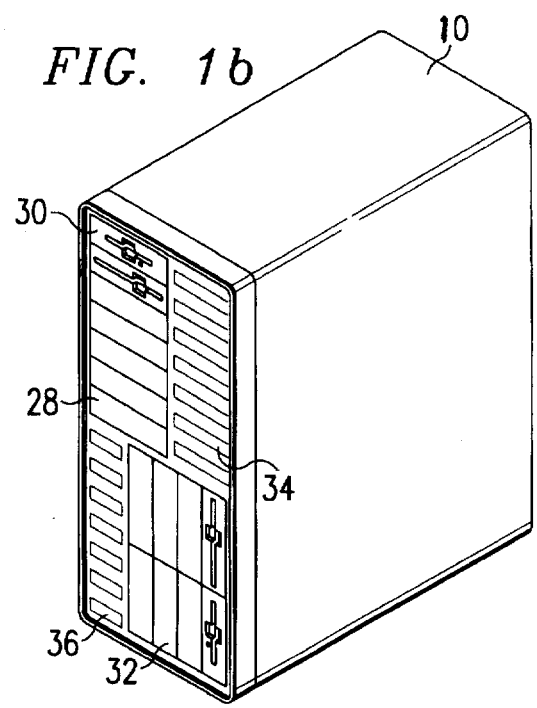
Figure 1C:
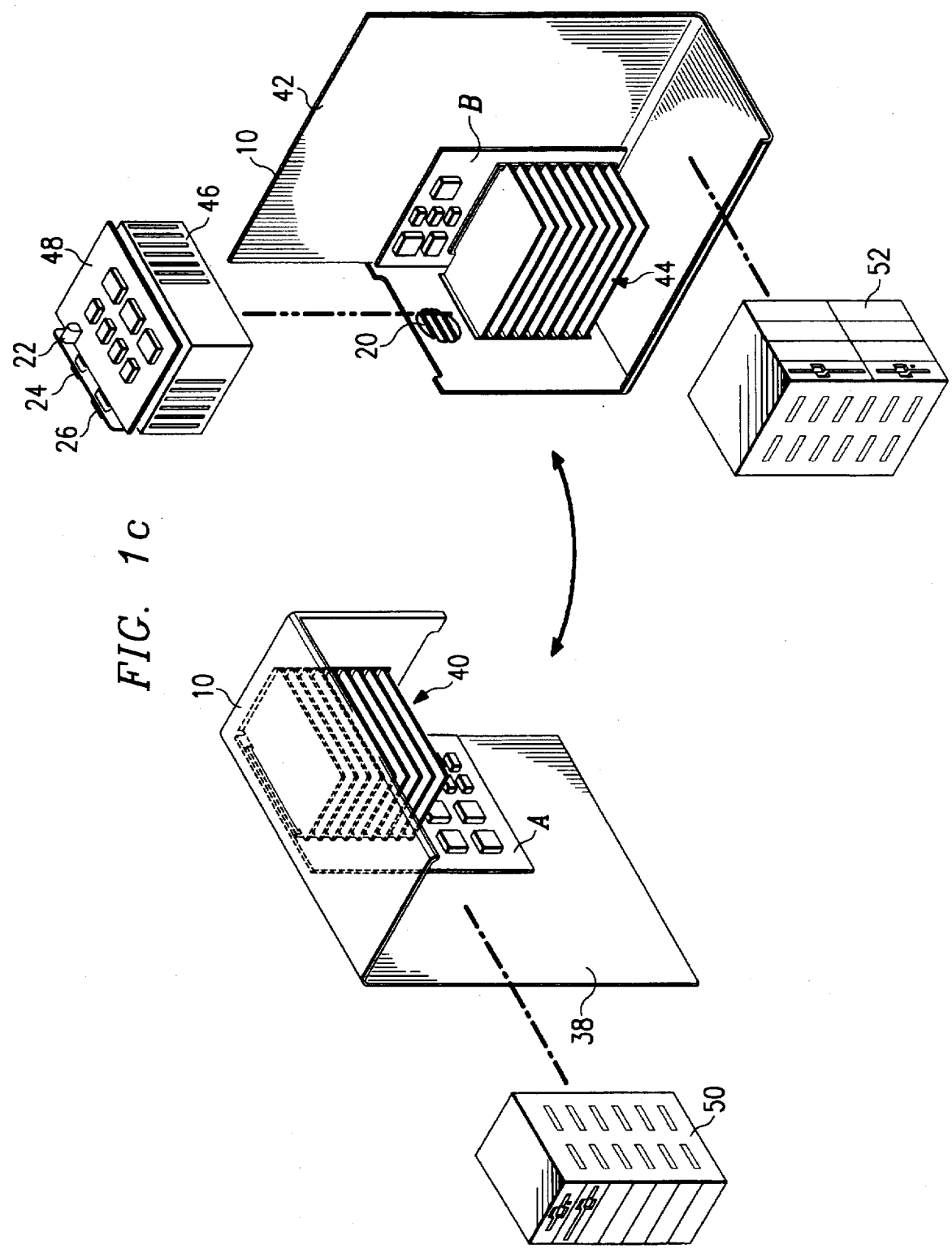

The system of the present invention provides for two completely independent motherboards housed within a single personal computer chassis. The motherboards share a common power supply and access is provided to the motherboards through a common keyboard and video support. FIGS. 1a through 1c are elevational diagrams which show the structural configuration of the two motherboards and their supporting circuitry within a single chassis. Referring to FIG. 1a, the rear view of a chassis 10 is shown. The rear face of the chassis 10 includes a section 14 which holds the ports for the plug-in boards of a first motherboard A. Similarly, a section 16 on rear plate 12 holds the ports for the plug-in boards of a second motherboard B. Disposed between sections 14 and 16 are the common port area 18 and the fan vent 20. The common port area 18 incudes the common keyboard port 22, the common video jack 24, and the common serial port 26. FIG. 1b is a front view of chassis 10 which illustrates the front plate 28. The front plate 28 incudes an area 30 which shows the access to the disk drive supports for the disk drives associated with motherboard A. Similarly, front plate 28 includes an area 32 which holds the disk drive supports for the disk drives associated with motherboard B. Venting areas 34 and 36 complete the area of front plate 28 and allow for ventilation for both motherboards A and B and the remaining components within chassis 10.

FIG. 1c is an exploded view of chassis 10 which illustrates the mechanical configuration of the components within chassis 10. Motherboard A can be seen in FIG. 1c affixed to a side plate 38 of chassis 10. Motherboard A comprises a personal computer motherboard comprising the microprocessor-based systems needed to implement a personal computer. The motherboard A includes a number of expansion slots which operate to hold expansion boards indicated generally at 40 in FIG. 1c.

Similarly, motherboard B can be shown affixed to a side plate 42 of chassis 10. Motherboard B comprises a personal computer motherboard including the microprocessor-based systems necessary to implement a personal computer. Motherboard B also includes a plurality of expansion slots which are shown in FIG. 1c holding a plurality of expansion boards indicated generally at 44.

The interior of vent opening 20 can be seen in FIG. 1c. A power supply 46 includes a vent fan (not shown) and when the system of the present invention is fully constructed, the power supply 46 and vent fan are affixed approximate the vent opening 20. A motherboard select circuit 48 is shown disposed above power supply 46. The keyboard port 22, the video output port 24 and the serial output port 26 are affixed and driven by the motherboard select circuit 48.

In general, the motherboard select circuit 48 receives keyboard signals from an external keyboard and receives a variety of signals from motherboard A and motherboard B. The motherboard select circuit 48 serves to allow a user of the integrated system to select which motherboard to interact with at a given time. The motherboard select circuit receives video and serial output signals and keyboard input signals and routes them to and from the selected motherboard.

The chassis 10 also includes space for a plurality of disk drive systems adjacent both motherboard A and motherboard B. For example, a disk drive support frame 50 is shown that, when constructed, is disposed adjacent motherboard A. Similarly, a disk drive support frame 52 is shown which, when constructed, is disposed adjacent motherboard B.

An important technical advantage of the present invention results from the fact that the motherboards and expansion boards capitalize on the symmetry of these structures to fit within a single chassis. As shown in FIG. 1c, the opposite halves of the chassis 10 fit together like a clamshell with expansion boards coupled to one motherboard fitting next to the expansion boards coupled to the opposite motherboard. In this manner, two complete personal computer systems can be contained in a chassis that is no larger than a traditional chassis used to hold a single system.

Figure 2:
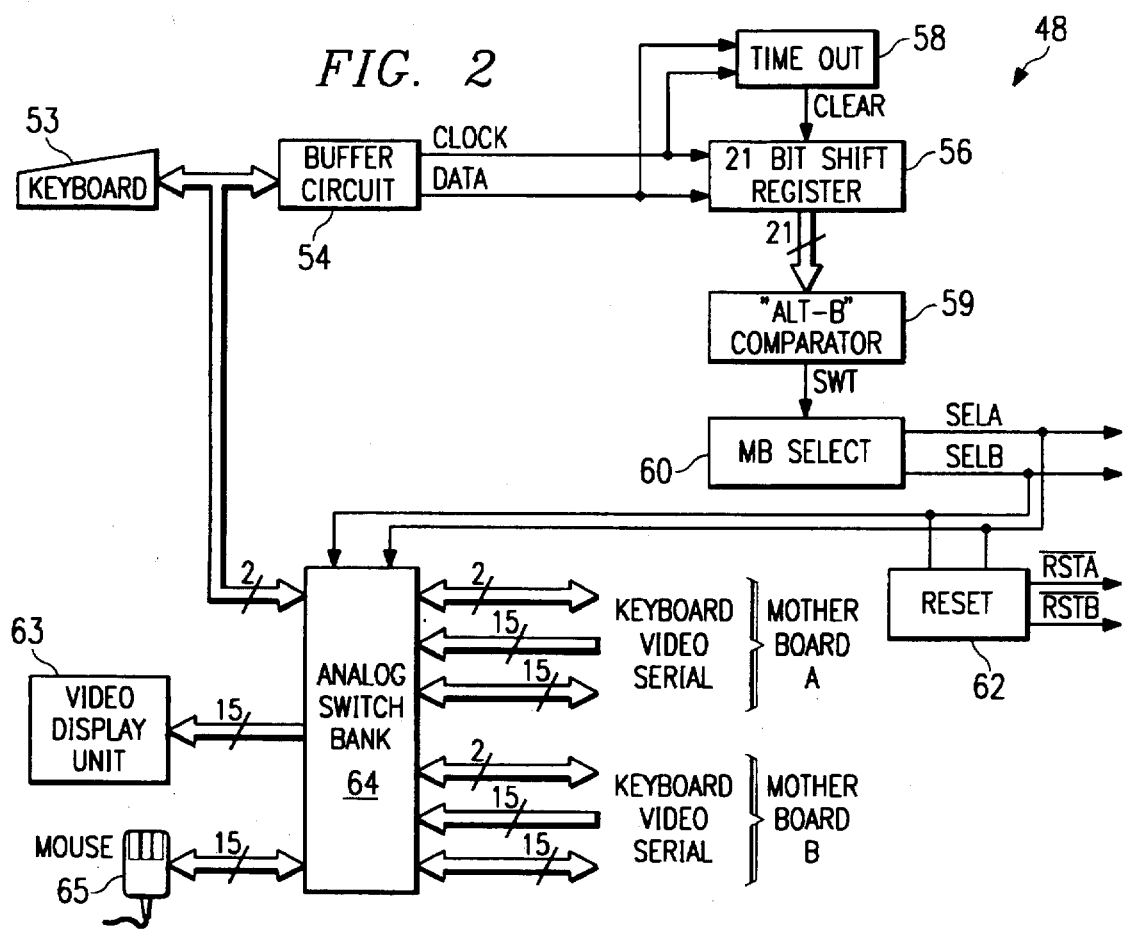
FIG. 2 is a block diagram of the motherboard select circuit constructed according to the teachings of the present invention.

FIG. 2 is a block diagram of the motherboard select circuit used in the computer system of the present invention. The motherboard select circuit 48 receives the keyboard clock and keyboard data inputs from a keyboard 53 into a buffer circuit 54. The buffer circuit 54 outputs a clock signal and a data signal which are both digital signals. The clock and data signals are output to a twenty-one bit shift register 56 and to a time-out circuit 58. The twenty-one bit shift register uses the clock signal to sequentially clock in twenty-one bits of information taken from the data signal. The time-out signal insures that the twenty-one bits of information happen within a predetermined period of time to prevent erroneous readings.

Once a twenty-one bit value has been loaded into the shift register, the twenty-one bits are transmitted in parallel to a comparator circuit 59. Comparator circuit 59 operates to compare the twenty-one bit value to a known value corresponding to a particular set of key strokes associated with a switch operation from one motherboard to another motherboard. According to one embodiment of the present invention, the ALT-B key sequence is used to switch operations from one motherboard to another. According to this embodiment of the present invention, when the comparator circuit 59 senses an ALT-B, a single pulse switch signal SWT is output from the comparator circuit 59 to the motherboard select switch 60. The motherboard select switch 60 generates either one of a pair of select signals SELA and SELB which are transmitted to a reset circuit 62 where the signals are used to generate reset signals for the motherboard A and motherboard B.

The pair of select signals SELA and SELB are also transmitted to an analog switch bank 64. The analog switch bank 64 is coupled to motherboard A through a pair of keyboard signals and fifteen video signals and fifteen serial port signals. Similarly, analog switch bank 64 is coupled to motherboard B through a pair of keyboard signals and fifteen video signals and fifteen serial signals. The analog switch bank is also coupled to the shared keyboard 53, a shared video display unit 63 and a shared mouse 65 through the keyboard port 22, the video port 24, and the serial port 26, respectively. Shared mouse 65 may comprise other suitable pointing devices or any other serial devices such as printers. Analog switch bank 64 functions to couple the ports 22, 24 and 26 to the particular motherboard signals selected using the pair of select signals SELA and SELB.

Figure 3:
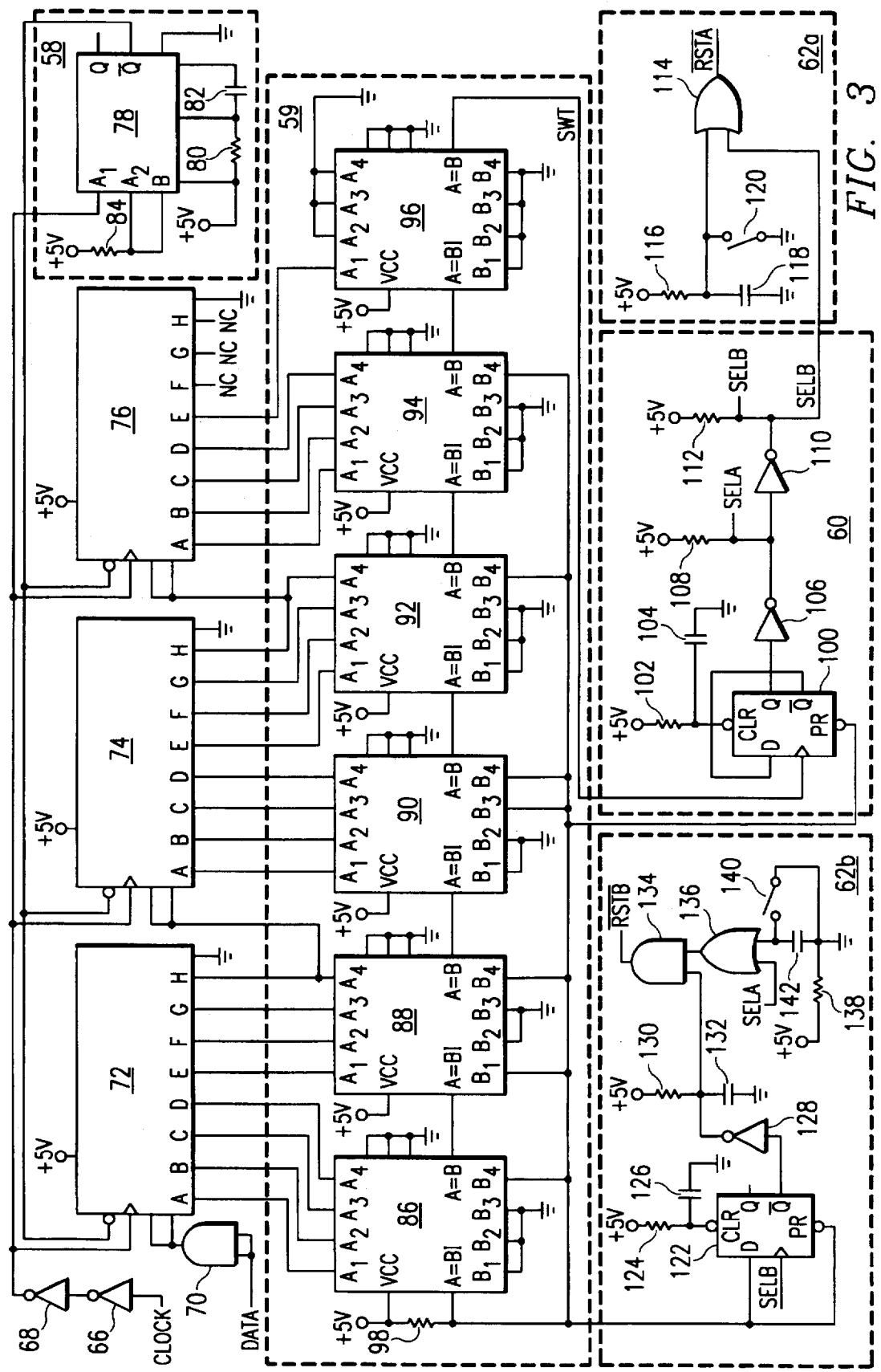
FIG. 3 is a schematic diagram of the analog switch module used in the motherboard select circuit constructed according to the teachings of the present invention.

FIG. 3 is a schematic block diagram of one embodiment of the shift register 56, the comparator 58, the motherboard select circuitry 60, the reset circuitry 62 and the timeout circuitry 58. Referring to FIG. 3, the clock signal is received into a series connection of two inverters 66 and 68 which serve to delay the clock signal to eliminate jitter in the keyboard clock signal. The data signal is received into both inputs of an AND gate 70 which serves as a buffer to reduce the TTL loading on the remainder of the circuit. The output of inverter 68 is input into an eight-bit serial shift register 72. The output of the AND gate 70 is also input into shift register 72. The overflow from serial shift register 72 is input into a second eight-bit serial shift register 74. Likewise, the overflow from serial shift register 74 is input into a third eight-bit serial shift register 76. The output of inverter 68 carrying the buffered clock signal is input into each of the shift registers 72, 74 and 76. In operation, the bits from the keyboard data signal are sequentially clocked into the shift registers 72, 74 and 76 until twenty-one bits are stored in the shift registers 72, 74 and 76 with eight bits in shift register 72, eight bits in shift register 74 and five bits in shift register 76.

The embodiment shown in FIG. 3 will search for the ALT-B keyboard sequence. Each key struck on a conventional PC keyboard generates a ten-bit code with an additional bit associated with the ALT key for a total of twenty-one bits for the two-key sequence of ALT-B.

The clock signal is also output from inverter 68 into the time-out circuit 58 which comprises a Schmitt trigger circuit 78. The Schmitt trigger circuit 78 utilizes a resistor 80 and a capacitor 82 to output a timed pulse to shift registers 72, 74 and 86. The timed pulse functions to require the ALT and B keys to be struck within the time period of the time pulse or the shift registers 72, 74 and 76 will be cleared. The Schmitt trigger 78 is coupled to a 5 volt power supply through a resistor 84 which may comprise a 4.7 kiloohm resistor. The Schmitt trigger 78 is also coupled to ground potential. The shift registers 72, 74 and 76 are also coupled to a 5 volt power supply and ground potential.

The twenty-one bits stored in shift registers 72, 74 and 76 are output in parallel to the comparator 59. Comparator 59 is shown in FIG. 3 to comprise six four-bit comparators 86, 88, 90, 92, 94 and 96. Comparators 86 and 88 receive the eight bits stored in shift register 72 and compare them to a predetermined bit pattern received from the 5 volt supply and ground potential. For example, the comparator 86 determines whether or not the first four bits stored in shift register 72 are a 0-0-0-1 bit pattern. If this bit pattern is stored in the first four bits of shift register 72, the comparator 86 will output an A=B signal to an A=B input of comparator 88. The A=B input of comparator 86 is tied to the 5 volt supply voltage through a 4.7 kiloohm resistor 98. The A=B signals cascade from comparator 86 through comparator 88 and eventually through comparator 96 if all the required bit patterns are present in shift registers 72, 74 and 76.

If the required bit patterns are present, the comparator 96 outputs the motherboard switch signal SWT. The motherboard switch signal SWT is input into the motherboard select circuit 60. Motherboard select circuit 60 comprises a flipflop 100 which has its clock input coupled to the SWT signal. The D input of the flipflop 100 is coupled to the Q output. The flipflop is coupled to the 5 volt supply voltage through a resistor 102. The node between the resistor 102 and the flip-flop is coupled to ground potential through a capacitor 104. The Q output of the flipflop is coupled to the input of an inverter 106. The output of the inverter 106 is coupled to the 5 volt power supply through a 4.7 kiloohm resistor 108. The output of inverter 106 generates the SELA motherboard select signal. The output of inverter 106 is coupled to the input of an inverter 110. The output of inverter 110 is coupled to the 5 volt power supply through a 4.7 kiloohm resistor 112. The output of inverter 110 comprises the SELB motherboard select signal.

The SELB motherboard select signal is output to a portion of the reset circuit 62 labeled as 62A in FIG. 3. The SELB signal is input into one input of an OR gate 114. The second input of 114 is coupled to the 5 volt supply voltage through a resistor 116. The second input of OR gate 114 is also coupled to ground potential through the parallel connection of a capacitor 118 and a switch 120. The output of OR gate 114 is a RSTA signal which is routed to the motherboard A and causes the motherboard A to go into a reset mode.

The SELB signal is routed to a second portion of the reset circuitry labeled as 62B in FIG. 3. The SELB signal is input into a flipflop 122. The D input of the flipflop input 122 is coupled to the 5 volt supply through the resistor 98. The clear input of the flipflop 122 is coupled to the 5 volt supply voltage through a resistor 124 and to ground potential through a capacitor 126. The Q output of the flipflop 122 is coupled to the input of an inverter 128. The output of inverter 128 is coupled to the 5 volt supply voltage through a resistor 130 and is coupled to ground potential through a capacitor 132. The output of inverter 128 is also coupled to one input of an AND gate 134. The second input of AND gate 134 is coupled to the output of an OR gate 136. One input of OR gate 136 is coupled to the SELA signal. The second input of OR gate 136 is coupled to the 5 volt supply voltage through a resistor 138. The second input to OR gate 136 is also coupled to ground potential through the parallel connection of a switch 140 and a capacitor 142. The output of AND gate 134 is a RSTB signal which is routed to motherboard B and operates to place motherboard B in a reset mode.

In general, the operation of reset circuitry 62 is to provide for initial reset of motherboard A on powering up the entire system. Motherboard B is not allowed to reset until motherboard B is selected. Under the conventional operation of personal computer systems, the reset operation or mode of operation of a motherboard forces the motherboard to do a booting operation. The booting operation can be interrupted and various parameters can be changed during the operation. As such, it is advantageous to be able to watch the video display coupled to a motherboard while it is booting. Accordingly, the system of the present invention is configured so that the motherboard A is initially in control of the common video display and performs a reset operation and boot operation upon power-up of the system. The motherboard B is not allowed to reset and boot up until the motherboard B is selected to allow the user of the combined system to watch the video display created by motherboard B as it boots.

The SELA and SELB signals are routed to analog switch bank 64. Analog switch bank 64 operates to switch the keyboard clock and keyboard data signals from the actual keyboard 53 of the system to the keyboard clock and keyboard data signals associated with motherboard A and motherboard B. This switching is done responsive to SELA and SELB signals. Similarly, the signals associated with the shared serial port 26 are switched between motherboard A and motherboard B responsive to the SELA and SELB signals so that, for example, a serial mouse or other pointing device can be shared between the two motherboards. Similarly, the signals required for the shared video port 24 including, for example, the vertical sync, red, green and blue signals and other appropriate video signals are switched responsive to the SELA and SELB signals between motherboard A and motherboard B respectively. As discussed previously, the power supply 46 provides constant power to both motherboard A and motherboard B simultaneously.

The integrated system of the present invention provides for the simultaneous operation of two separate motherboards within a single personal computer chassis. This configuration can be used in a variety of applications. For example, in network architectures, a personal computer is often dedicated as a file server, print server or communications server. As a server, the computer itself is rarely accessed and spends the majority of its time performing data transfer and storage operations associated with its server role. In this context, a dual motherboard system could create a usable node of the network and still maintain the server operations as a background operation. For example, motherboard A could be used as a typical personal computer to perform word processing, accounting, or file-related functions. Motherboard B could function in the background in a server role. When necessary, the server could be accessed using the video, mouse and keyboard associated with the motherboard A personal computer. This is a highly cost efficient solution as almost half the cost associated with a personal computer system is associated with the video, keyboard, power supply, chassis and, in general, the systems peripheral to the motherboard and main processing systems. By sharing the power supply chassis, video, keyboard and mouse, the costs of a personal computer that is rarely accessed directly by a user can be greatly reduced.

The multiple motherboard system of the present invention can also be used in applications where highly processor-intensive activities need to be performed in the background. For example, a single tomographic system comprises a system where data from an ultrasound machine is rapidly gathered and placed in a three-dimensional memory for eventual display as a three-dimensional image. The calculations needed to place the data values in the appropriate locations within the three-dimensional memory are highly intensive and involve the calculation of various transcendental functions as well as ordinary address-related arithmetic. At the same time, the physician operating the tomographic system needs a foreground computer to perform the functions typically associated with a two-dimensional tomographic system including receiving the data from the ultrasound sensors, changing magnification and offset values and alphanumeric labeling of various features. The dual motherboard system of the present invention is highly suited to this application because an entire background personal computer can be dedicated to the management of the three-dimensional memory. The foreground or primary motherboard can thus be used to operate the traditional ultrasound equipment. The two motherboards can interact through a variety of peripheral connections. For example, each of the motherboards can support a network card or direct communication facility that can allow data to pass very quickly between the two motherboards.

It should be understood that while the system of the present invention is disclosed with reference to two motherboards, the teachings of the present invention are equally applicable to multi-motherboard systems. The chassis 10 can easily be adapted to hold more than two motherboards and the selection circuitry can easily be adapted to toggle through a number of motherboards using the shared keyboard.

Although the present invention has been described in detail, it should be understood that various changes, substitutions and alterations can be made to the descriptions disclosed herein without departing from the spirit and scope of the invention which is solely defined by the appended claims.

What is claimed is:

1. A data processing system comprising:

a shared chassis;

a shared power supply;

a first motherboard disposed within the shared chassis and coupled to the shared power supply, the first motherboard having a first plurality of microprocessor-based systems to implement a personal computer, the first motherboard operable to perform a first operation;

a second motherboard disposed within the shared chassis and coupled to the shared power supply, the second motherboard having a plurality of microprocessor-based systems to implement a personal computer, the second motherboard operable to perform a second operation simultaneously with the first operation performed by the first motherboard;

a shared video display unit;

a shared keyboard; and a select circuit coupled to the shared video display unit the shared keyboard and the first motherboard and the second motherboard, the motherboard select circuit operable to independently of the first motherboard motherboard in order to drive the shared video display unit the keyboard, the motherboard select circuit operable to allow a user of the data processing to select which of the first and second motherboards coupled to the shared video display unit and the shared keyboard.

2. The data processing system of claim 1, wherein the motherboard select circuit comprises a reset circuit operable to cause the reset of one of the first and second motherboards upon power-up of the data processing system, the reset circuit further operable to cause the reset of the other of the first and second motherboards only when the other of the first and second motherboards is selected by the user to control the output to the video display unit.

3. The data processing system of claim 1, wherein one of the first and second motherboards is operable to receive commands from the user of the system at a given moment and the other of the first and second motherboards is operable to function as a server at the same given moment.

4. The data processing system of claim 1, wherein the shared chassis comprises:

a first half;

a second half; and the first half fitting with the second half in a clamshell configuration.

5. The data processing system of claim 1, wherein the bared keyboard is operable to receive a data signal, and wherein the motherboard select circuit comprises:

a comparator circuit operable to compare the data signal against a predetermined signal corresponding to a particular set of key strokes associated with a switch operation between the first motherboard and the second motherboard, the comparator circuit further operable to output a pulse switch signal in response to the comparison of the data signal and the predetermined signal; and a select switch coupled to the comparator circuit, the select switch operable to receive the pulse switch signal and generate either a first select signal for selecting the first motherboard or a second select signal for selecting the second motherboard.

6. A data processing system comprising:

a shared chassis;

a shared supply;

a first motherboard disposed within the shared chassis and coupled to the shared power supply, the first motherboard having a first plurality of microprocessor-based systems to implement a personal computer and a first plurality of expansion slots operable to receive a first plurality of expansion boards, the first motherboard operable to perform a first operation;

a second motherboard disposed within the shared chassis and coupled to the shared power supply, the second motherboard having a second plurality of microprocessor-based systems to implement a personal computer and a second plurality of expansion slot operable to receive a second plurality of expansion boards, the second motherboard operable to perform a second simultaneously with the first operation performed by first motherboard;

a shared video display unit;

a shared keyboard; and a motherboard select circuit coupled to the shared video display unit and the shared keyboard and the first motherboard and the motherboard, the motherboard select circuit operable to function independently of the first motherboard and the second motherboard in order drive the shared video display unit and the shared keyboard, the motherboard select circuit further operable to allow a user of the data processing system to select which of the first and second motherboards is coupled to the shared video display unit and the shared keyboard.

7. The data processing system of claim 6, wherein the motherboard select circuit comprises a reset circuit operable to cause the reset of one of the first and second motherboards upon power-up of the data processing system, the reset circuit further operable to cause the reset of the other of the first and second motherboards only when the other of the first and second motherboards is selected by the user to control the output to the video display unit.

8. The data processing system of claim 6, wherein the shared chassis comprises:

a first half;

a second half; and the first half fitting with the second half in a clamshell configuration.

9. The data processing system of claim 6, wherein the slated keyboard is operable to receive a data signal, and wherein the motherboard select circuit comprises:

a comparator circuit operable to compare the data signal against a predetermined signal corresponding to a particular set of key strokes associated with a switch operation between the first motherboard and the second motherboard, the comparator circuit further operable to output a pulse switch signal in response to the comparison of the data signal and the predetermined signal; and a select switch coupled to the comparator circuit, the select switch operable to receive the pulse switch signal and generate either a first select signal for selecting the first motherboard or a second select signal for selecting the second motherboard.

10. A data processing system comprising:

a shared chassis;

a first motherboard disposed within the shared chassis, the first motherboard operable to perform a first operation;

a second motherboard disposed within the shared chassis, the second motherboard operable to perform a second operation simultaneously with the first operation performed by the first motherboard;

one of the first and second motherboards operable to receive commands from a user of the data processing system at a given moment and the other of the first and second motherboards ms operable to function as a server at the same given moment;

a shared video display unit;

a shared keyboard; and a motherboard select circuit coupled to the shared video display unit and the shared keyboard and the first motherboard and the second motherboard, the motherboard select circuit operable to function independently of the first motherboard and the second motherboard in order to drive the shared video display unit and the shared keyboard, the motherboard select circuit further operable to allow the user of the data processing system to select which of the first and second motherboards is coupled to the shared video display unit and the shared keyboard.

11. The data processing system of claim 10, wherein:

the first motherboard comprises a first plurality of microprocessor-based systems necessary to implement a personal computer; and the second motherboard comprises a second plurality of microprocessor-based systems necessary to implement a personal computer.

12. The data processing system of claim 10, wherein shared chassis comprises:

a first half;

a second half; and the first half fitting with the second half in a clamshell configuration.

13. The data processing system of claim 10, wherein motherboard select circuit comprises a reset circuit to cause the reset of one of the first and second motherboards upon power-up of the data processing system, reset circuit further operable to cause the reset the other of the first and second motherboards only the other of the first and second motherboards is selected by the user to control the output to the video display unit.

14. A data processing system comprising:

a shared chassis;

a shared power supply;

a first motherboard disposed within the shared chassis and coupled to the shared power supply, the first motherboard having a first plurality of microprocessor-based systems to implement a personal computer, the first motherboard operable to perform a first operation;

a second motherboard disposed within the shared chassis and coupled to the shared power supply, the second motherboard having a second plurality of microprocessor-based systems to implement a personal computer, the second motherboard operable to perform a second operation simultaneously with the first operation performed by the first motherboard;

a shared video display unit;

a shared keyboard; and a motherboard select circuit coupled to the shared video display unit and the shared keyboard and the first motherboard and the second motherboard, the motherboard select circuit operable to allow a user of the data processing system to select which of the first and second motherboards is coupled to the shared video display unit and the shared keyboard, the motherboard select circuit comprising a reset circuit operable to cause the reset of one of the first and second motherboards upon power-up of the data processing system, the reset circuit further operable to cause the reset of the other of the first and second motherboards only when the other of the first and second boards is selected by the user to control the output to the video display unit.

15. A data processing system comprising:

a shared chassis;

a shared power supply;

a first disposed within the shared chassis and coupled to the shared power supply, the first motherboard having a first plurality of microprocessor-based systems to implement a personal computer and a first plurality of expansion slots operable to receive a first plurality of expansion boards, the first motherboard operable to perform a first operation;

a second motherboard disposed within the shared chassis and coupled to the shared power supply, the second motherboard having a second plurality of microprocessor-based systems to implement a personal computer and a second plurality of expansion operable to receive a second plurality of expansion the second motherboard operable to perform a second operation simultaneously with the first operation performed by the first motherboard;

a shared video display unit;

a shared keyboard; and a motherboard select circuit coupled to the shared video display unit and the shared keyboard and the first motherboard and the second motherboard, the motherboard select circuit operable to allow a user of the data processing system to select which of the first and second motherboards is coupled to the shared video display unit and the shared keyboard, the motherboard elect circuit comprising a reset circuit operable to cause the reset of one of the first and second motherboards upon power-up of the data processing system, the reset circuit further operable to cause the reset of the other of the first and second motherboards only when the other of the first and second motherboards is selected by the user to control the output to the video display unit.

16. A data processing system comprising:

a shared chassis;

a first motherboard disposed within the shared chassis, the first motherboard operable to perform a first operation;

a second motherboard disposed within the shared chassis, the second motherboard operable to perform a second operation simultaneously with the first operation performed by the first motherboard;

one of the first and second motherboards operable to receive commands from a user of the data processing system at a given moment and the other of the first and second motherboards is operable to function as a server at the same given moment;

a shared video display unit;

a shared keyboard; and a motherboard select circuit coupled to the shared video display unit and the shared keyboard and the first motherboard and the second motherboard, the motherboard select circuit operable to allow the user of the data processing system to select which of the first and second motherboards is coupled to the shared video display unit and the shared keyboard, the motherboard select circuit comprising a reset circuit operable to cause the reset of one of the first and second motherboards upon power-up of the data processing system, the reset circuit further operable to cause the reset of the other of the first and second motherboards only when the other of the first and second motherboards is selected by the user to control the output to the video display unit.

* * * * *